United States Patent

[11] 3,588,659

[72] Inventor George L. Rogers
 Waynesboro, Va.
[21] Appl. No. 760,777
[22] Filed Sept. 19, 1968
[45] Patented June 28, 1971
[73] Assignee General Electric Company

[54] HETERODYNE SYSTEM FOR A POSITION SERVOMECHANISM WHEREBY SYSTEM IS ADAPTABLE TO A PLURALITY OF TRANSDUCERS
13 Claims, 4 Drawing Figs.
[52] U.S. Cl. .................................................. 318/608,
 318/607, 318/661
[51] Int. Cl. .......................................................... G05b 1/01
[50] Field of Search ............................................ 318/20.360,
 20.370, 20.735

[56] References Cited
UNITED STATES PATENTS
2,433,195 12/1947 Bond ........................... 318/(20.370)
2,758,204 8/1956 Norby ...................... 318/(20.370UX)
2,861,177 11/1958 Dishal et al. ................ 318/(20.370UX)
3,175,138 3/1965 Kilroy et al. ................. 318/(20.370UX)
3,462,663 9/1969 Schiller ......................... 318/(20.360)

Primary Examiner—T. E. Lynch
Attorneys—Lawrence G. Norris, Michael Masnik, Stanley C. Corwin, Frank L. Neuhauser, Oscar B. Waddell and Melvin M. Goldenberg ABSTRACT: A phase position control system for machine tools is illustrated and described which includes a high frequency position indicator, a summation circuit for summing or heterodyning the output of the indicator with a reference signal of slightly different frequency, and a filter and waveshaper circuit for eliminating all components of the indicator output except the AC fundamental of the difference component envelope. A signal derived from the envelope is compared in a discriminator with a command phase signal of equal frequency whereby any difference in phase provides an output to drive a servomotor so that a machine tool may be moved to the desired position. In this manner, a single servosystem can be made compatible with any position indicator available.

INVENTOR.
GEORGE L. ROGERS
BY Michael Masnik
HIS ATTORNEY

INVENTOR.
GEORGE L. ROGERS
BY Michael Masnik
HIS ATTORNEY

HETERODYNE SYSTEM FOR A POSITION SERVOMECHANISM WHEREBY SYSTEM IS ADAPTABLE TO A PLURALITY OF TRANSDUCERS

BACKGROUND OF THE INVENTION

This invention relates generally to frequency converters and, more specifically, to a frequency converter which preserves the phase information content of a high frequency signal.

The apparatus of the present invention is adapted for use with phase position control systems of a general type which utilize low frequency variable-phase control and reference signals. Such a system is disclosed in Pat. No. 3,248,622, Kelling, assigned to the assignee of the present invention, wherein position control information in the form of digital or numerical data is fed to a control circuit including a phase counter which also has as an input a reference signal derived from a clock source. The phase counter produces a command phase signal which varies in phase relative to the reference signal by an amount proportional to a desired position. The reference signal provides both a time base for the position control system and energizes or excites a position indicating means, such as a resolver or selsyn, which provides an output signal which has a frequency equal to that of the reference signal and whose phase relative to that of the reference signal is shifted by an amount depending on the position of the indicator shaft and thus upon actual position. The phase of an output signal of the indicator or an actual position signal derived therefrom is then compared with the phase of the command phase signal. If the phase of the command phase signal and the indicator output signal are different, a comparing means drives a servomotor until both signals are in phase.

In the context of position control systems, then, the term "information content" of either a command phase or position signal can be expressed as either a desired or an actual position which is embodied in the "phase" thereof relative to a reference signal. In addition, any comparison of phase must be made with signals of the same frequency or else the information content thereof has little value.

Generally, the position indicators known to the art operate at low frequencies, such as 250Hz. Consequently, the reference signal and thus the command phase signal has been limited to low frequencies. However, low frequency systems have a number of disadvantages with respect to a system whose position indicator can or must be operated at a higher frequency.

First, the ability of the system to respond to small differences in phase is impaired as the frequency of the reference signal decreases.

Second, it has been found that certain position indicating means, including some electromechanical resolvers, perform best at high frequencies. To build an electromagnetic position indicator which will perform satisfactorily at low frequencies requires a design which is manufactured to an extremely close tolerance and which requires a large amount of copper wire and a large quantity of iron to increase the signal to a level suitable for use in a control system. Necessarily, such electromagnetic position indicators are expensive. Certain other electromagnetic position indicators are designed to operate at high frequencies. One such device has essentially no magnetic structure and is therefore a very poor transformer. Very small output is obtained from this device even at high frequencies, in the order of 150 millivolts at 10kHz. This figure is down approximately 40 db. at the low frequencies previously used. A capacitive position indicator would require high frequency excitation; for this reason, their use in position control systems has been limited.

Of course, the phase counter and the ensuing portion of the control system could be redesigned to operate in the frequency range of the indicator used. But this approach would limit the system to use with that particular indicator, as the system would have little compatibility with position indicators operating at other frequencies.

One approach in the prior art has been to convert the low frequency signals into high frequency equivalents. However, this approach has serious drawbacks in that the circuitry which is required to convert without loss of phase information content is complicated and necessitates the use of several servosystems in addition to that of the position control system, thereby further increasing errors and cost. In addition, such an approach requires that the remaining portion of the position control system be redesigned to operate at high frequencies.

SUMMARY OF THE INVENTION

It is, therefore, a specific object of this invention to provide an apparatus which allows high frequency excitation of an electromagnetic or other position indicator means, yet allows the remaining portion of a position control system to operate at low frequencies.

It is still a further object of this invention to provide such a frequency conversion apparatus which preserves the phase information content of a high frequency position signal when converted to a low frequency suitable for use with the remaining portion of the position control system.

These objects are achieved, according to the one embodiment of the invention, by heterodyning the high frequency position signal with a second signal having a frequency equal to the frequency of the position signal, plus or minus the frequency of a low frequency command phase signal, to obtain a signal which includes a component having a frequency equal to that of the low frequency command phase signal. By filtering, this component can be reproduced as an output signal which varies in phase as does the first signal.

BRIEF DESCRIPTION OF THE DRAWINGS

The subject matter of the invention is particularly pointed out and distinctly claimed in the concluding portion of the specification. For a complete understanding of an embodiment of the invention together with further objects and advantages thereof, reference should be made to the following description taken in conjunction with the accompanying drawings in which:

DESCRIPTION OF THE PREFERRED EMBODIMENT

Figure 1:
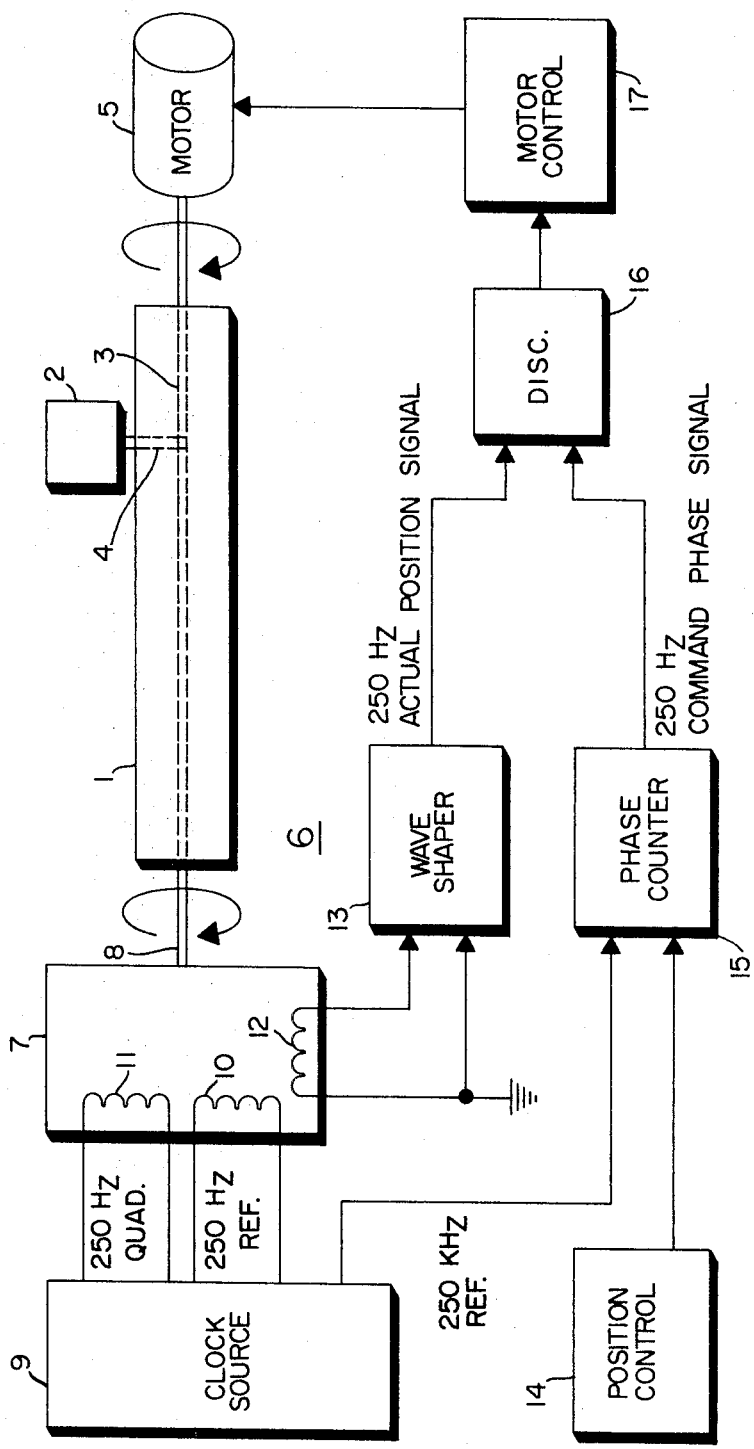
FIG. 1 is a schematic diagram of a position control system using phase position control.

Reference should be made to the phase position control system illustrated in FIG. 1 which is designed for use with a device whose position is to be controlled such as a machine tool including a table 1 and a movable carriage 2. Carriage 2 is positioned with respect to table 1 by means of a leadscrew 3 which rotates in the table and which moves carriage 2 by means of a nut arrangement 4. In turn, the position of leadscrew 3 is controlled by means of a servometer 5 which, in most cases, is a DC shunt wound motor of low speed and high torque. A feedback control system generically designated at 6 is furnished to control the servometer 5 so that the carriage 2 may be positioned very accurately and precisely with respect to the table 1 by means of leadscrew 3. The feedback control system is that commonly known in the art as a phase position control system. Generally, such a system produces a command phase or desired position signal of a given frequency from numerical data and compares this desired position signal with an actual position signal, of the same frequency, obtained by a position indicating means coupled to the leadscrew or carriage. After calibration, the system generally can provide, by a comparison of the relative phase of the actual and desired signals, an output signal to control the servomotor 5 so that the carriage 2 moves to the desired position.

In the embodiment illustrated in FIG. 1, feedback control system 6 includes a position indicating means 7 which can be an electromechanical device having a rotary shaft 8 coupled to the leadscrew 3 either directly or through the medium of intervening gears. Generally, such electromechanical devices are known by the name of resolvers and comprise stator windings disposed about the circumference of a stator and rotor windings disposed on a rotor attached to the shaft 8. The stator windings are arranged so that by application of a suitable reference signal thereto, a resultant voltage is developed in the rotor winding which can be made to shift in phase with respect to the reference signal an amount proportional to the angular displacement of the rotor from a given position. Generally, for 360° rotation of the shaft 8, the voltage appearing on the rotor winding will shift 360° in phase with respect to the reference signal. Thereby, the phase of the voltage appearing on the rotary winding is directly proportional to the position of shaft 8 and thus to the position of leadscrew 3 and carriage 2.

Although the discussion of position indicators has been and will continue to be couched in terms of electromechanical devices, it is to be understood that the invention relates to any position indicating means involving phase shifting of a frequency excitation or reference signal.

In the prior art system shown in FIG. 1, let it be assumed that the position indicating means 7 is a resolver which is excited with 250Hz reference and quadrature signals from a clock source 9. These signals may either be sinusoidal or quasi-sinusoidal in waveform, depending on which is easier to derive from the clock source 9. The 250Hz reference and quadrature signals are applied to stator windings 10 and 11 respectively of resolver 7. An output signal appears at rotor winding 12 of the resolver which is connected to a waveshaper 13. If the 250Hz reference and quadrature signals are sinusoidal, the output signal applied to waveshaper 13 is sinusoidal. If the reference and quadrature signals have a quasi-sinusoidal waveform, the output signal applied to waveshaper 13 is generally sinusoidal, but with some high frequency components. If quasi-sinusoidal waves are used, it is desirable that the waveshaper 13 detect the zero crossings of the sinusoidal fundamental components of the output signal and produce therefrom an actual position signal having the same frequency and phase, and a waveform as required by the remaining circuitry. In sum, the actual position signal has a phase information content representative of the actual position of the carriage 2.

A desired position signal is obtained from a position control circuit 14 which converts information contained in a data storage means to numerical or digital data which is coupled to a phase counter 15. Also supplied as an input to phase counter 15 is a 250kHz. reference signal. In phase counter 15, the 250kHz. reference signal is divided to provide a 250Hz command phase signal whose phase, relative to that of the reference signal, is varied in response to the numerical data by omitting or adding digital counts in short bursts. This phase displacement is thus representative of the desired carriage position.

The phase of the command phase signal is compared with the phase of the actual position signal in a discriminator 16 to provide a DC output thereof whose amplitude is proportional to the difference in phase of the input signals. This output is coupled to a motor control 17 which thereupon energizes motor 5 to move leadscrew 3 and thus carriage 2 to the desired position, at which the input signals are in phase and discriminator 16 produces zero output.

For the comparison of an actual position signal and a command phase signal to be possible, both must have the same frequency. Thus, the position indicating device such as resolver 7 must be excited at 250Hz unless means can be found to preserve the phase information content thereof. Surely, it would appear that the phase counter 15 could be so designed as to provide a high frequency command phase signal, but in practice this is not found to be feasible. Certainly, the other alternative is to lower the frequency of the output signal appearing at the rotor winding 12 and it is to this end that the present invention is directed.

Figure 2:
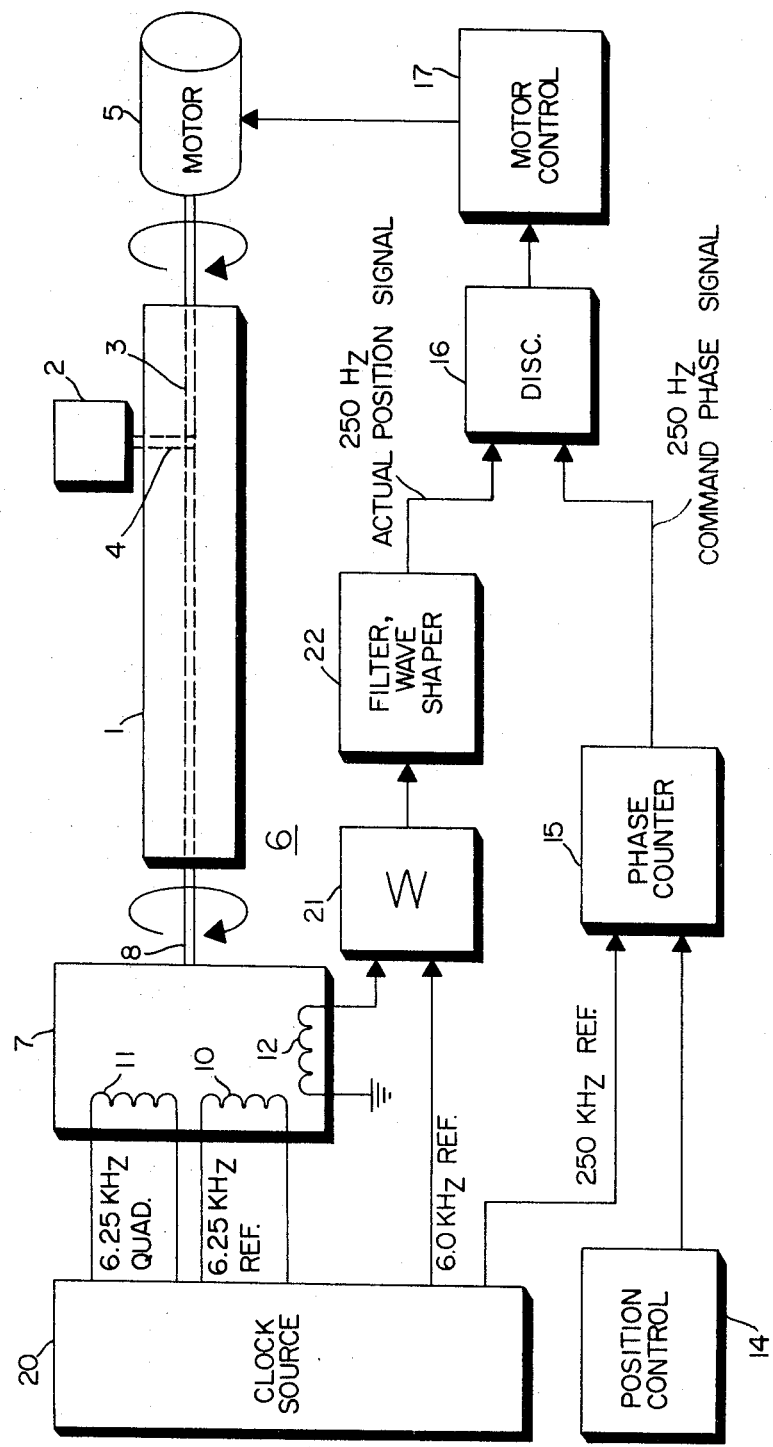
FIG. 2 is a schematic diagram of a position control system using phase position control constructed according to the teachings of this invention.

Reference should now be made to FIG. 2 in which like elements to those of FIG. 1 are represented by like numerals. The position indicator 7 is excited by a high frequency reference and quadrature signal from a clock source 20. In the embodiment illustrated, the signals have a frequency of 6.25kHz. Clock source 20 also provides a second reference signal of slightly different frequency, which is in this case 6.0kHz. and a third reference signal having a frequency of 250kHz. Excitation of the high frequency position indicator 7 by means of 6.25kHz. reference and quadrature signals results in an output signal appearing at the rotor winding 12 thereof which has a frequency of 6.25kHz. and which varies in phase relative to the first reference signal by an amount determined by the position of shaft 8.

The high frequency output signal and the reference signal of slightly different frequency are combined in summation means 21. Simply, summation means 21 can comprise any circuit which can mathematically sum the two aforementioned signals within the frequency range of interest, which would be from the frequency of the low frequency command phase signal, or approximately 250Hz, to that of the higher-frequency reference signal, or approximately 6.25kHz. By summing these signals, the principle of heterodyning occurs whereby sum and difference components of the original two frequencies are obtained in an output of summation means 21. With the values stated, the output from summation means 21 includes components having frequencies of 13.25kHz. and 250Hz. It can be readily recognized that the 250Hz fundamental component has the same frequency as the command phase signal obtained from phase counter 15.

Moreover, it will hereinafter be shown that the difference component varies in phase as does the high frequency output signal. Therefore, choice of the frequencies to be used in the first high frequency reference signal and the second high frequency reference signal of slightly different frequency is governed in part by frequency limitations of the position indicating means 7 and in part by the fact that these signals must differ in frequency by an amount equal to the frequency of the low frequency command phase signal. In the above-mentioned example, if the reference signal is 6.25kHz. the reference signal of slightly different frequency can either be 6.0kHz. or 6.5kHz. Alternately, the signals applied to position indicator 7 could be either 6.0kHz. or 6.5kHz. and the signal of slightly different frequency applied to summation means 21 could be 6.25kHz. subject to certain conditions to be later described.

For an excellent description of the principle of heterodyning, reference should be made to Radio Engineering by F.E. Terman, Second Edition, pp. 446—449, or Radio Engineering Handbook by F. E. Terman, pp. 567—569. From that material the resultant waveform obtained by summing two signals of slightly different frequency pulsates at the sum component thereof and has an amplitude varying at the frequency of the difference component. It is this envelope which provides for operation in accordance with the teachings of this invention.

Also, from that material it can be seen that the envelope contains a DC component plus a sinusoidal difference frequency component and sinusoidal components of all harmonic frequencies. All of the sinusoidal components include a phase angle which is a function of the phase relationship of the two heterodyning signals.

By eliminating the DC components and all harmonics of higher frequency than the difference frequency there is left a sinusoid given by the equation for its instantaneous amplitude.

$e = E \sin[(W_0 - W_1)t_0 + \theta_1]$ in which $W_0$ and $W_1$ are the heterodyning frequencies and $\theta_1$ is the angle determined by the phase relationship between $W_0$ and $W_1$. If $W_1$ is phase shifted through an angle of 360° with respect to $W_0$, $\theta_1$ will also shift 360° at the difference frequency.

From the general equations for heterodyne operation, the maximum output and stability occur if the two signals are of equal amplitude.

The output of summation means 21 is coupled to a filter and waveshaper circuit 22. Basically, circuit 22 removes all components of the output from a summation means 21 except the difference frequency component, then senses the zero crossings thereof and produces a low frequency waveform. This low frequency waveform varies in phase as does the difference component and is hereinafter designated as the actual position signal. Comparison of the low frequency command phase signal with the actual position signal is made in discriminator 16 which, as before, produces an output to motor control 17 proportional to the difference in phase therebetween.

Figure 3:
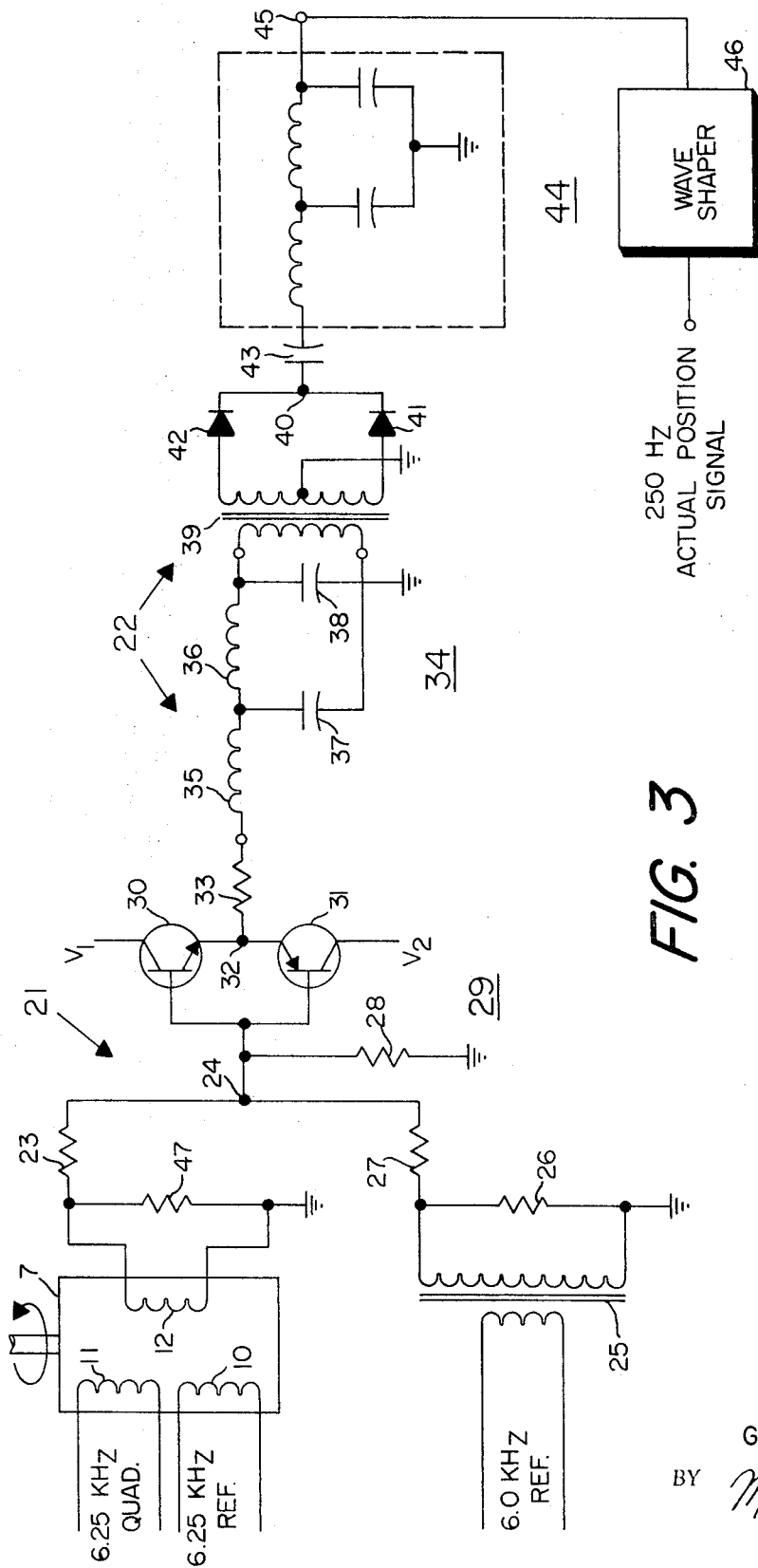
FIG. 3 is a preferred embodiment of the heterodyne system of this invention.

In FIG. 3, a preferred embodiment of summation circuit 21 and filter waveshaper circuit 22 is illustrated. Again, like numerals signify like elements. The summation circuit 21 includes a resistor 47 disposed across the rotor winding 12 and a resistor 23 coupling one side of winding 12 to a common point 24. Similarly, the reference signal of slightly different frequency is coupled to common point 24 by means of a transformer 25, a resistor 26 disposed across the secondary thereof, and a resistor 27 coupling one side of the secondary to point 24. Both resistors 47 and 26 have one side connected to ground potential. Transformer 25 performs two functions: first, it isolates the clock source 20 from the remainder of the summation means 21 and from the filter and waveshaper circuitry 22; and second, it changes the voltage level of the reference signal of slightly different frequency to a level approximately equal to that obtained from the rotor winding 12. The summation is effected by a resistor 28 disposed between common point 24 and ground and the voltage or signal appearing at point 24 contains both sum and difference components of the two input signals thereto.

Common point 24 is connected to the filter and waveshaper circuit 22 through an impedance matching means 29 which comprises a transistor 30 of one conductivity type and a transistor 31 of an opposite conductivity type. Transistor 30 has its collector connected to a positive voltage supply $V_1$ and its emitter to a common point 32 and to the emitter of transistor 31. Transistor 31 likewise has its collector connected to a negative voltage supply $V_2$. Coupled to the bases of both transistors 30 and 31 is common point 24. In operation, transistors 30 and 31 present a constant impedance to point 24 but pass both positive and negative portions of the voltage appearing thereon to common point 32. Therefore, resistor 28 cannot be loaded by the ensuing filter and waveshaper circuit 22 to produce distortion of the voltage at point 24.

Common point 32 is coupled to the input of the circuit 22 through a resistor 33. In practice, the elements of the filter portion of circuit 22 depend on the nature of the reference signals obtained from clock source 20. In the embodiment illustrated in FIG. 3, position indicating means 7 has been supplied with quasi-sinusoidal waves. As the output signal appearing on winding 12 is consequently distorted, having components of all frequencies therein, it is necessary to provide two filter stages. The first filter stage, designated at 34, is a low pass filter which is designed to remove all components higher in frequency than the lower frequency of the two high frequency reference signals obtained from clock source 20. With the values shown, this frequency is 6.0kHz. Filter circuit 34 may comprise a ladder network of reactors 35, 36 and capacitors 37 and 38 as illustrated.

Filter circuit 34 is disposed across the primary winding of a second isolation transformer 39 which changes the voltage level of the output therefrom. A center tap of the secondary winding of transformer 39 is connected to ground and the two extremities thereof are connected to a common point 40 through diodes 41 and 42. Diodes 41 and 42 together with the center tapped secondary provide full wave rectification of the output from filter stage 34. In this manner, the negative portion of the difference component envelope is inverted and added to the positive portion. At common point 40 the signal is a rectified replica of the aforementioned envelope and contains not only the desired difference frequency component, but also the DC and harmonic components.

Common point 40 is coupled to the waveshaper portion of circuit 22 through a capacitor 43 and a second filter stage 44. Filter 43 may be any low-pass filter well known to the art, such as the illustrated ladder network. The filter is designed to remove all components of the signal on point 40 having a frequency higher than the difference component. With the values shown, this frequency is 250Hz. Likewise, capacitor 43 removes the DC component. At the output of filter stage 44, designated as 45, the waveform is a sinusoid having zero crossings for every cycle of the difference component.

Waveshaper circuitry 46 may be any which can transform zero crossings into a low frequency waveform of equal frequency and phase. The waveform may be either sinusoidal or square, depending on the signal required by discriminator 16.

In order that the actual position signal obtained may preserve the phase information content of the high frequency output signal from position indicator 7, it has been found that two conditions must be met. First, the high frequency reference signals supplied to the position indicating system of FIG. 3 must have a fixed phase relationship with respect to each other. This relationship may be obtained, in the case of quasi-sinusoidal waves, by dividing out the reference signal frequencies from a single high frequency clock source. With the frequencies taught in the embodiment of FIG. 3, however, the single clock source frequency would be at least 1.5MHz.

Second, the frequency of either the first or second high frequency reference signals must be a multiple of the frequency of the difference component, or, of the command phase signal.

Figure 4:
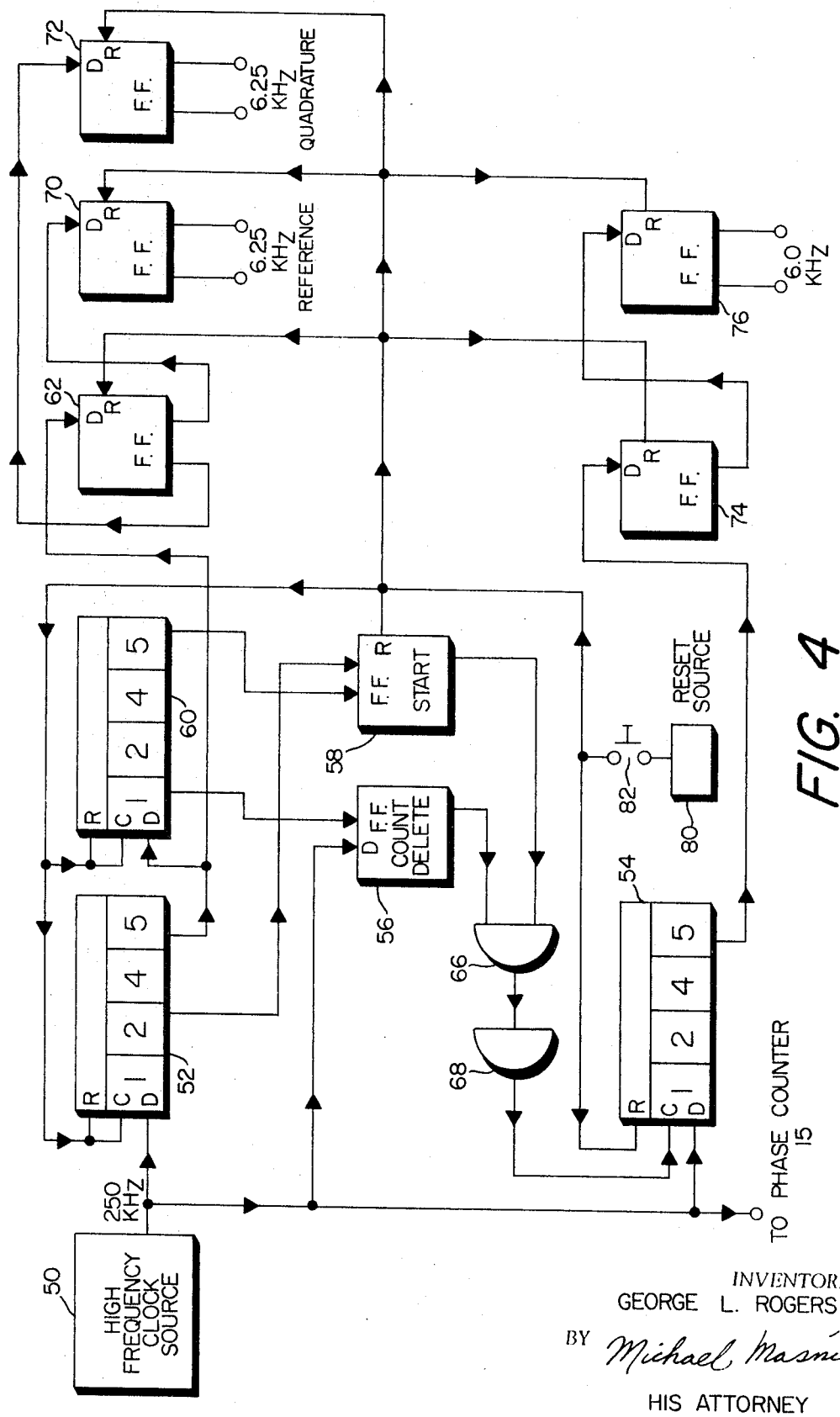
FIG. 4 is a block diagram of a clock source for use with the heterodyne system.

To satisfy both these conditions of fixed phase relationship and multiple frequency relationship, but yet allow the use of a single, moderate-frequency clock source, the embodiment of FIG. 4 may be utilized.

The first, second and third reference signals are derived from a single clock source 50 which may be any fixed-frequency oscillator well known to the art which produces a stable output having a quasi-sinusoidal or square wave shape. When the reference frequencies shown in FIG. 3 are to be produced, the frequency of source 50 may be 250kHz. The output of clock source 50 is connected to drive inputs D of decade counters 52, 54 and to the drive input D of a count delete circuit 56. In addition, the output is connected to phase counter 15 and serves as the third reference signal. Decade counters 52 and 54 are "divide by 10" counters having four stages corresponding to the numbers 1, 2, 4 and 5 further include a control or count input C and a reset input R. Although this embodiment is described in terms of four-stage digital counters, it is to be clearly understood that any other counter configuration may readily be used.

An output of the "2" stage of counter 52 is coupled to an input of a start circuit 58. An output of the "5" stage of counter 52 is coupled to both a drive input D of a decade counter 60, also of four-stage, "divide by 10" configuration and a drive input D of a "divide by 2" counter or flip-flop 62. A first output of counter 62 is connected to the drive input D of a second "divide by 2" counter 70. A phase-shifted, second output of counter 62 is connected to the drive input D of a third "divide by 2" counter 72.

An output of the "1" stage of counter 60 is connected to a second input of count delete circuit 56 and an output of the "5" stage of counter 60 is connected to a second input of the start circuit 58. Count delete circuit 56 and start circuit 58 are connected to the inputs of a NAND gate 66 whose output is coupled through a NOT circuit or inverter 68 to the count input C of counter 54.

An output of the "5" stage of counter 54 is connected to the drive input D of a fourth "divide by 2" counter 74 whose output is coupled to the drive input D of a fifth "divide by 2" counter 76.

"Divide by two" counters 62, 70, 72, 74 and 76 and count delete circuit 56 may comprise self and manually resettable flip-flops or bistable multivibrators. On the other hand, start circuit 58 must comprise a bistable multivibrator resettable only by the application of a pulse to the reset input R thereof.

Finally, a source 80 of reset voltage is coupled by means of a start switch 82 to reset inputs R of decade counters 52, 54, and 56, to the reset input R of start circuit 58 and to reset inputs R of "divide by 2" counters 62, 70, 72, 74 and 76.

In operation, the circuitry of FIG. 4 derives from the 250kHz. clock source 50 a 6.25kHz. reference signal which appears at the output terminals of counter 70, a 6.25kHz. quadrature signal which is present at the output terminal of counter 72, and a 6.0kHz. reference signal which appears at the output terminals of counter 76.

Decade counter 52, and counters 62, 70 and 72 simply divide down the 250kHz. high frequency clock source output to provide the 6.25kHz. reference and quadrature signals. Likewise, production of the 6.0kHz. is accomplished by decade counter 54 and counters 74 and 76. The output frequency of counter 76 is adjusted to exactly 6.0kHz. by count removing circuitry which removes certain counts or pulses from the 250kHz. output. This function is provided by the "1" stage output of decade counter 60, the count delete circuit 56, and gates 66 and 68.

A fixed phase relationship between the aforementioned 6.0kHz. and 6.25kHz. signals is assured by both the aforementioned count removing circuitry including count delete circuit 56 and by circuitry including the "2" stage output of counter 52, the "5" stage output of counter 60, start circuit 58, and gates 66 and 68.

Finally, a multiple frequency relationship is established by choosing the first and second high frequency signal values accordingly and by deriving both those reference signals from the same clock source 50 by means of counters whose division factor is fixed.

More particularly, the 250kHz. signal from source 50 may comprise a series of pulses alternating between binary levels 1 and 0. The count cycle is begun by momentary closure of start switch 82 which applies the reset voltage from source 80 to all counters and to start circuit 58. In decade counters 52 and 60, the reset voltage is also applied to count or control inputs C whereby the counters are prevented from counting so long as start switch 82 is closed.

The start circuit 58, when reset applies a logic "1" to NAND gate 66. Gates 66 and 68 function as an inverted AND gate whereby a count enabling zero output is provided only when both inputs thereto are logic zero. Thus a logic "1" is applied to the count control input C of decade counter 54 preventing it from counting. Thus all counters are reset to zero and prevented from counting so long as start switch 82 is closed. The count delete circuit or flip-flop remains set.

When the start switch 82 is opened, all reset inputs R and the count inputs C of decade counters 52 and 60 are made a permissive logic "0". Thereafter, decade counter 52 performs as a simple decade counter with respect to its state "5" output. Accordingly, the output frequency of counter 52 is 25kHz., that of counter 62 is 12.5kHz., and that of counter 70 is 6.25kHz. As the second output of counter 62 is phase-shifted from the first output by 180 electrical degrees, the output of counter 72 is 6.25kHz. in quadrature as a result of the "divide by 2" operation.

When the start switch 82 is opened, the start circuit 58 instance binary 1 and the signal applied to the count or control input C of counter 54 is a binary 0, thus placing counter 54 in a counting or enabled mode.

In this manner, production of the 6.0kHz. reference is begun at a point in time and at a definite phase of the 6.25kHz. reference signal which will assure that the 6.0kHz. signal has a definite and repeatable phase relationship with respect to the 6.25kHz. signals. With the frequency values enumerated, it has been found that starting the production at the 53rd pulse from source 50 provides this definite phase relationship. However, it is to be clearly understood that when different frequencies are used for the reference signals in question, that a different start count will be necessary to maintain this fixed phase relationship.

The count removing circuitry including count delete circuit 56 converts a 25kHz. which would normally be present at the "5" stage output of counter 54 to a 24kHz. signal and maintains the previously established fixed phase relationship between the 6.0kHz. and 6.25kHz. signals. To this end, count delete circuit 56 removes certain regularly spaced counts or pulses from the output of source 50 when an output is present at the "1" stage of digital counter 60. It can be seen that such an output will be produced at 10, 30, 60 and 80 counts of the total pulses from clock source 50. The output of count delete circuit 56 is normally binary 1 and thus acts to enable counter 54 through gates 66 and 68. By coincidence of the "1" stage output with the drive signal from clock source 50, the count delete circuit 56 is enabled so that the next pulse from clock source 50 changes the output level thereof from binary 1 to binary 0. Accordingly, on the 11th, 31st, 61st and 81st pulses from source 50, count delete circuit 56 maintains counter 54 in a noncounting mode by means of gates 66 and 68. As the output of counter 54 is at 10, 30, 60, 80, 110, etc., counts of the total pulses from clock source 50. The output of count delete circuit 56 is normally binary 0 and thus acts to enable counter 54 through gates 66 and 68. By coincidence of the "1" stage output with the drive signal from clock source 50, the count delete circuit 56 is enabled so that the next pulse from clock source 50 changes the output level thereof from binary 0 to binary 1. Accordingly, on the 11th, 31st, 61st, 81st, 111th, etc. pulses from source 50, count delete circuit 56 maintains counter 54 in a noncounting mode by means of gates 66 and 68. As the output of counter 54 is thus 24kHz., the output of counter 74 is 12.0kHz. and the output of counter 76 is the required 6.0kHz. signal.

By deleting counts from the actuation of digital counter 54 at regularly spaced intervals, count delete circuit 56 maintains the fixed phase relationship between the 6.0kHz. and 6.25kHz. signals which was initially established by start circuit 58.

With the aforementioned conditions in mind, it is to be clearly understood by those skilled in the art that this invention is not limited to the preferred embodiments described and that its bounds are intended to be set only by the limits of the following claims.

I claim:

1. In a position indicating system including means for producing a high frequency reference signal, and means for producing a high frequency position indicating signal whose phase with respect to the high frequency reference signal varies with changes in the position being indicated, an improvement for obtaining a low frequency position indicating signal, comprising:

a. means for producing a second reference signal having a frequency which differs slightly from that of the high frequency reference signal by an amount equal to that of the low frequency position indicating signal, either said second reference signal or said high frequency reference signal having a frequency which is a multiple of the frequency of the low frequency indicating signal;

b. means for maintaining a fixed phase relationship between said second reference signal and said high frequency reference signal for any changes in position indicating signal;

c. means for summing said second reference signal with said high frequency position indicating signal; and, d. means coupled to the output of said summation means for deriving therefrom a difference component whose fundamental frequency is equal to that of the low frequency position indicating signal, the phase of said difference component varying with changes in the position being indicated as does the phase of the high frequency position indicating signal.

2. The improvement for a position indicating system, as recited in claim 1, wherein said summation means further includes a first impedance coupling the high frequency position indicating signal to a common point, a second impedance coupling said second reference signal to the common point, and a third impedance disposed from the common point to ground.

3. The improvement for a position indicating system, as recited in claim 2, wherein said deriving means further comprises filter means removing all components of the output of said summation means but said difference component.

4. The improvement for a position indicating system, as recited in claim 3, wherein said filter means further comprises:
   a. a first low-pass filter eliminating all components of the output of said summation means which have a frequency higher than that of said high frequency position indicating signal;
   b. means for providing full-wave rectification of the output of said first low-pass filter; and,
   c. a second low-pass filter eliminating all components from the output of said rectifying means having a frequency higher than that of said difference component.

5. The improvement for a position indicating system, as recited in claim 3, further comprising:
   a. a high frequency clock source;
   b. first means coupled to said clock source for dividing out the high frequency reference signal therefrom;
   c. said second reference signal producing means including second means coupled to said clock source for dividing out said second reference signal therefrom; and,
   d. said phase-maintaining means being connected to said first dividing-out means to control said second dividing-out means.

6. The improvement for a position indicating system as recited in claim 1, wherein said deriving means further comprises filter means removing all components of the output of said summation means but said difference component.

7. The improvement for a position indicating system, as recited in claim 6, wherein said filter means further comprises:
   a. a first low-pass filter eliminating all components of the output of said summation means which have a frequency higher than that of the high frequency position indicating signal;
   b. means for providing full-wave rectification of the output of said first low-pass filter; and,
   c. a second low-pass filter eliminating all components from the output of said rectifying means having a frequency higher than that of said difference component.

8. The improvement for a position indicating system, as recited in claim 7, further comprising:
   a. a high frequency clock source;
   b. first means coupled to said clock source for dividing out the high frequency reference signal therefrom;
   c. said second reference signal producing means including second means coupled to said clock source for dividing out said second reference signal therefrom; and,
   d. said phase-maintaining means being connected to said first dividing-out means to control said second dividing-out means.

9. The improvement for a position indicating system, as recited in claim 1, further comprising:
   a. a high frequency clock source;
   b. first means coupled to said clock source for dividing out the high frequency reference signal therefrom;
   c. said second reference signal producing means including second means coupled to said clock source for dividing out said second reference signal therefrom; and,
   d. said phase-maintaining means being connected to said first dividing-out means to control said second dividing-out means.

10. The improvement for a position indicating system, as recited in claim 9, wherein said second dividing-out means includes a digital counter having drive and control inputs, said high frequency clock source being connected to said drive input and said phase-maintaining means being connected to said control input.

11. The improvement for a position indicating system, as recited in claim 10, wherein said phase-maintaining means further comprises:
   a. means coupled to said first dividing-out means for producing an output signal until a definite phase of the high frequency reference signal has been obtained;
   b. means coupled to said first dividing-out means for producing an output signal at regularly spaced phase intervals of the high frequency reference signal; and,
   c. means coupling said output signals to said control input of said digital counter whereby said counter is disenabled whenever either output signal is present.

12. In a position system including a high frequency clock source, means for deriving a high frequency reference signal therefrom, means for producing a high frequency position indicating signal whose phase with respect to the high frequency reference signal varies with changes in the position of a device being controlled, and means for controlling the position of said device, an improvement comprising:
   a. means obtaining from said high frequency clock source a second reference signal having a frequency which differs slightly from that of the high frequency reference signal by an amount equal to that of a low frequency position indicating signal, either said second reference signal or said high frequency reference signal having a frequency which is a multiple of the frequency of the low frequency position indicating signal, said second signal and said high frequency reference signal having a fixed phase relationship to each other for any changes in position indicating signal;
   b. means for summing said second reference signal with said high frequency position indicating signal;
   c. means coupled to the output of said summation means for deriving therefrom a difference component whose fundamental frequency is equal to that of said low frequency position indicating signal, the phase of said difference component varying as does the phase of the high frequency position indicating signal;
   d. means converting said difference component into the low frequency position indicating signal;
   e. a source of input data;
   f. means producing a desired position signal from the high frequency clock source and said input data;
   g. means comparing said low frequency position indicating signal and said desired position signal to produce an output signal whose value is proportional to the difference in phase therebetween; and,
   h. means coupling said output signal to the means controlling said device.

13. The position control system of claim 12 wherein difference component deriving means further includes a filter, a full-wave rectifier, and a source of a reference voltage, said reference voltage being coupled to said rectifier whereby said difference component comprises a series of pulses having minimum values of said reference voltage at said fundamental frequency, and said converting means further includes a waveshaper responsive to said minimum values of said difference component for producing said low frequency position indicating signal.